Dec. 24, 1968  W. C. PURDY ET AL  3,418,459
GRAPHIC CONSTRUCTION DISPLAY GENERATOR
Original Filed Nov. 25, 1959  4 Sheets-Sheet 1
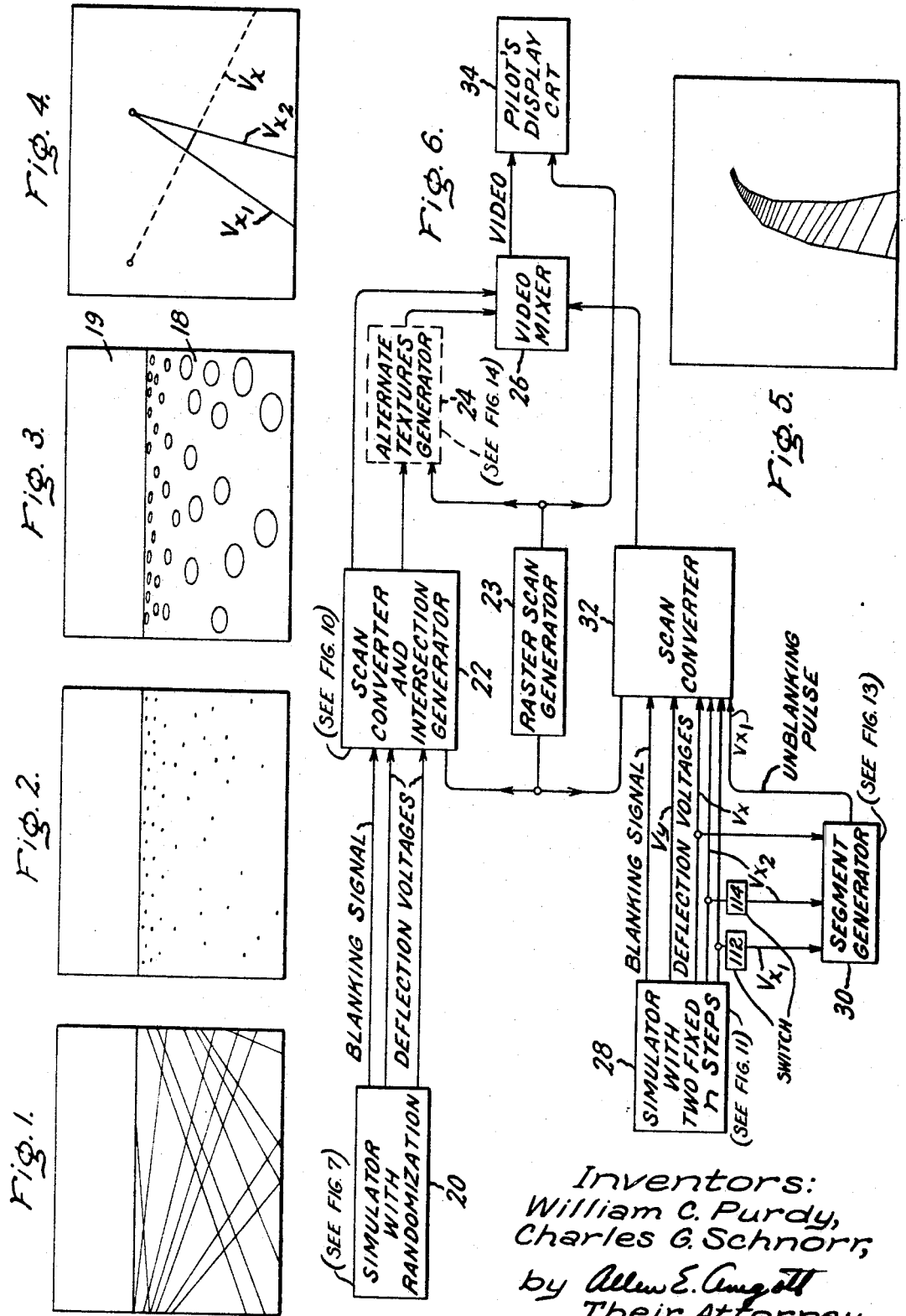
Inventors:
William C. Purdy,
Charles G. Schnorr,
by Allen E. Amgott
Their Attorney.

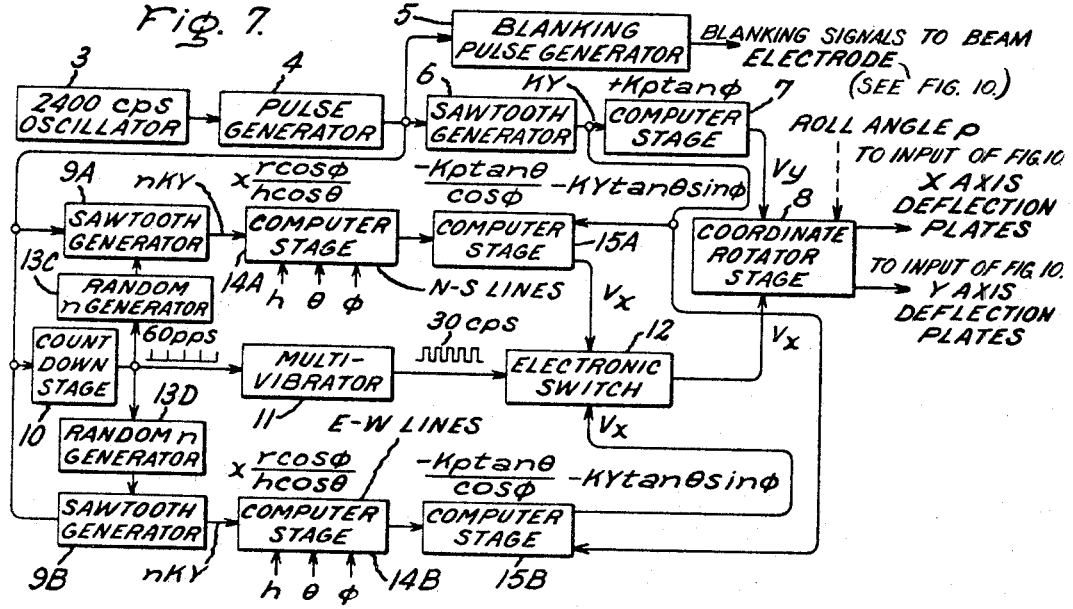
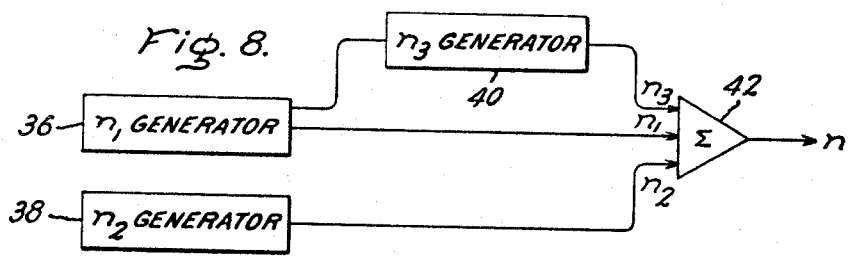
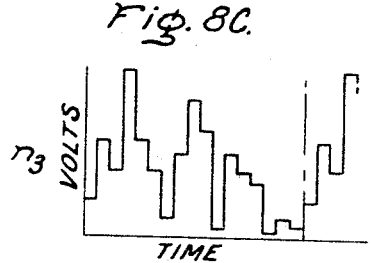
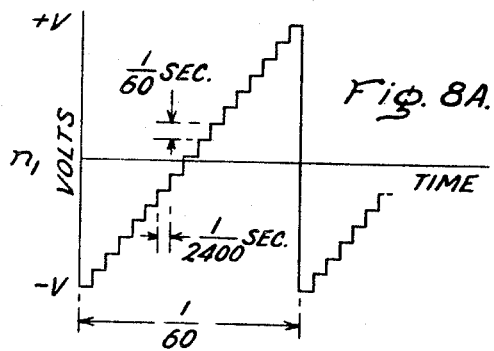
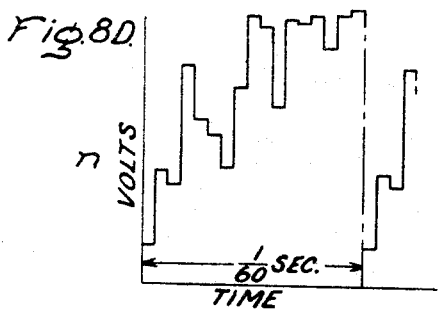
Inventors:
William C. Purdy,
Charles G. Schnorr,
by Allen E. Amgott
Their Attorney.

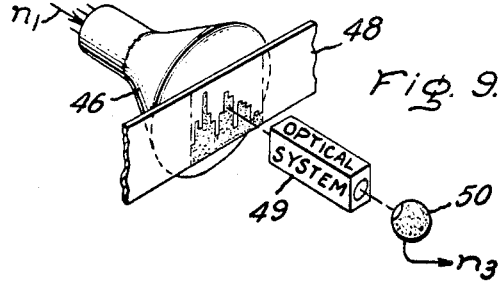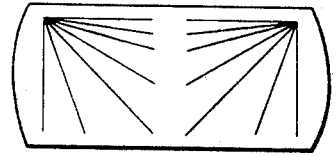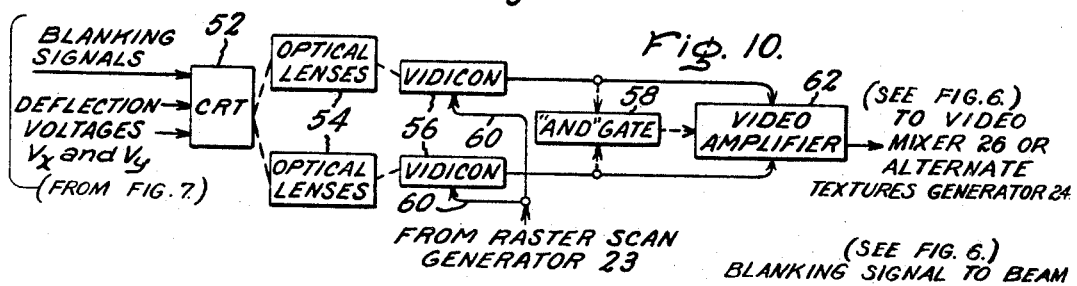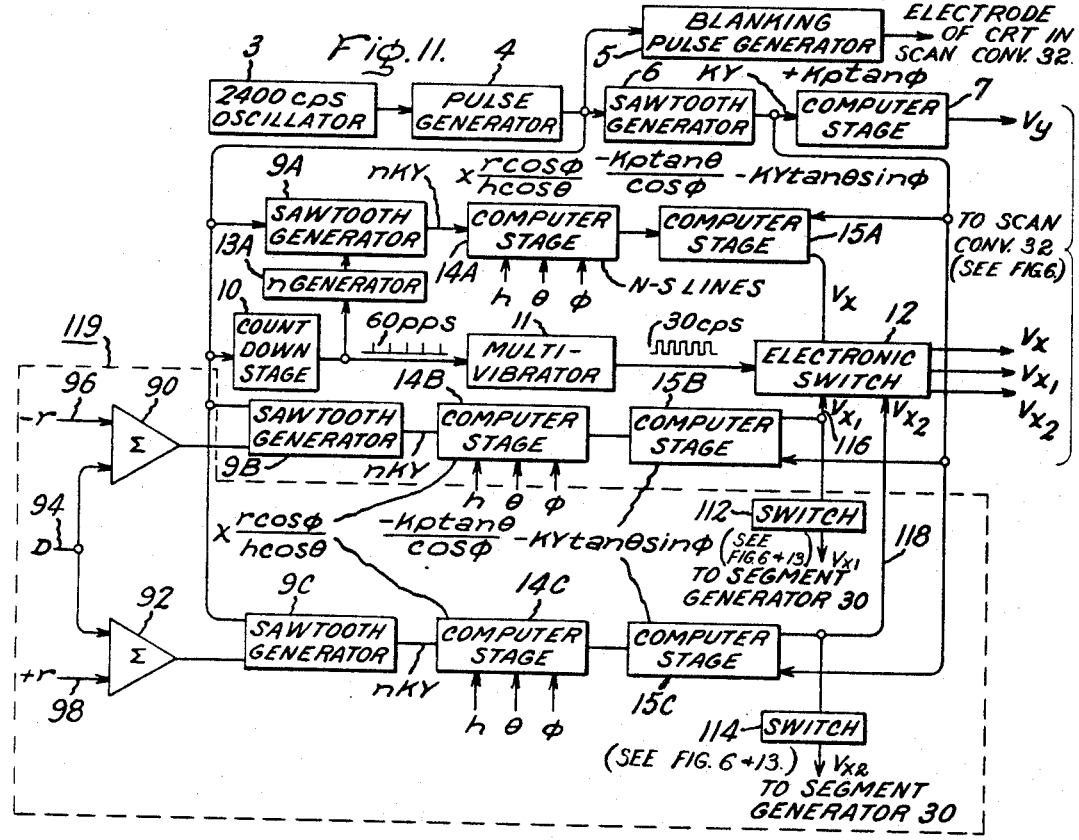

Dec. 24, 1968  W. C. PURDY ET AL  3,418,459
GRAPHIC CONSTRUCTION DISPLAY GENERATOR
Original Filed Nov. 25, 1959  4 Sheets-Sheet 4
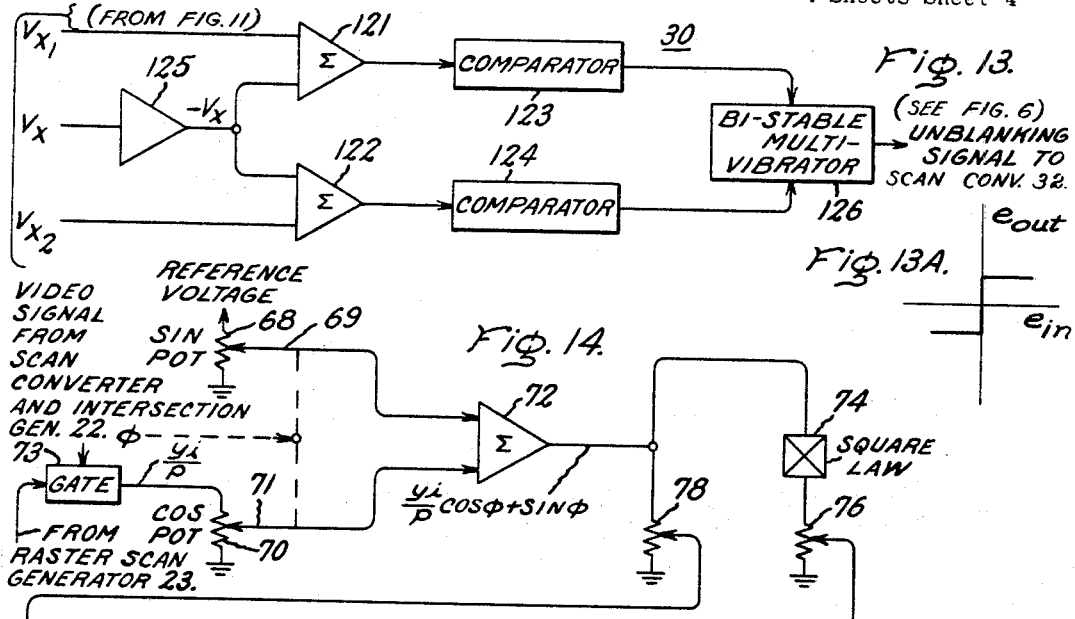
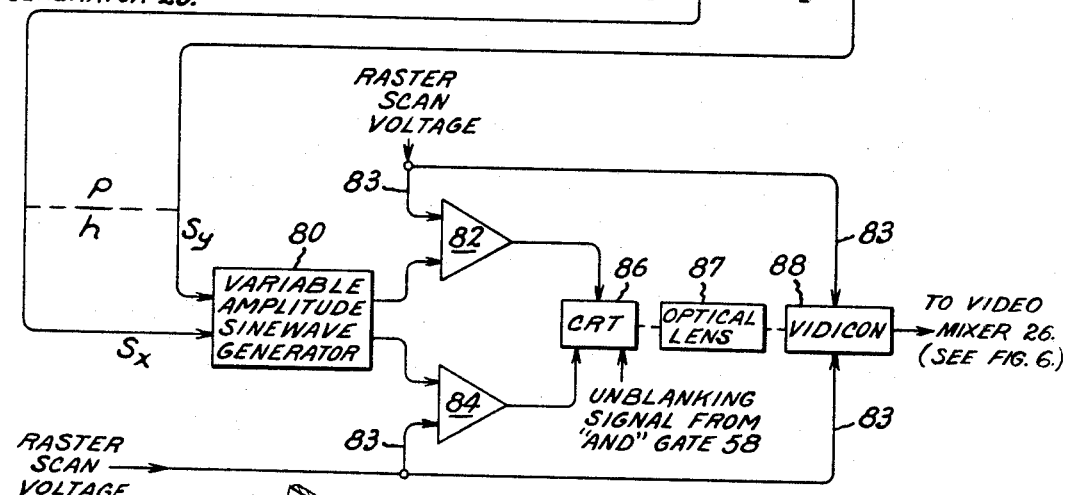
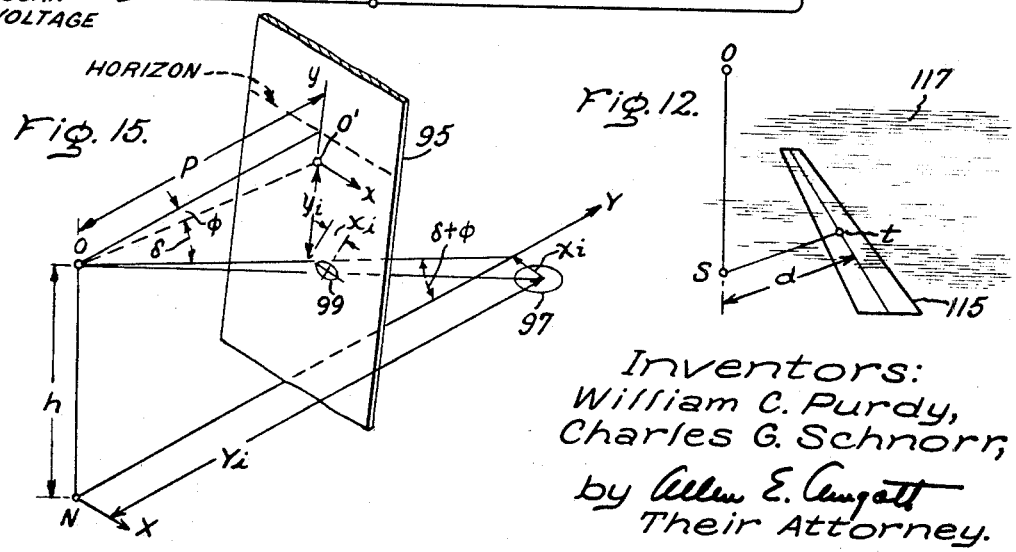
Inventors:
William C. Purdy,
Charles G. Schnorr,
by Allen E. Amgott
Their Attorney.

United States Patent Office 3,418,459
Patented Dec. 24, 1968

3,418,459
GRAPHIC CONSTRUCTION
DISPLAY GENERATOR
William C. Purdy and Charles G. Schnorr, Ithaca, N.Y.,
assignors to General Electric Company, a corporation
of New York
Continuation of application Ser. No. 855,435, Nov. 25,
1959. This application June 16, 1967, Ser. No. 646,740
11 Claims. (Cl. 235—150.2)

This is a continuation of application Ser. No. 855,435, filed on Nov. 25, 1959, now abandoned.

This invention relates to airborne instrumentation, and more particularly to an improved electronic system that visually portrays the instantaneous posture of an aircraft with respect to the surface of the earth or to other references such as flight obstacles.

In a co-pending application, Ser. No. 784,717, filed Jan. 2, 1959 now Patent Number 3,098,929, issued July 23, 1963, entitled "Electronic Contact Analog Simulator" by Paul H. Kirchner, and assigned to the same assignee, there is disclosed an electronic system wherein the posture of an aircraft with respect to the ground terrain is reduced visually apparent on a cathode ray tube (CRT) display within the cockpit of the aircraft. By utilizing certain trigonometric functions of conventional variables such as the pitch angle and the roll angle in conjunction with the voltage analog of the altitude, deflection potentials and blanking voltage signals for a cathode ray tube are derived. The line pattern which is traced upon the phosphorescent inner surface of such a tube by utilizing these potentials appears to the pilot as a perspective view of the terrain passing under the aircraft. Motions described by the aircraft give rise to variations in the line pattern and cause it to change in the same manner in which the actual appearance of the terrain would change to an observer.

The particular display electronically generated in co-pending application Ser. No. 784,717 presents a regular pattern of lines on a cathode ray tube and provides the observer (pilot) with an illusion of a three-dimensional picture of the terrain passing beneath the aircraft on a two-dimensional surface. While such a display is a major advance over the use of numerous cockpit devices and meters to provide the pilot with contact flight data, it is desirable to extend the capabilities of such a system to present additional information such as "flight obstacles" in the path of the aircraft, both the ground and sky planes, the terrain, and ground targets.

Accordingly, it is an object of this invention to extend the capability of present day electronic contact analog simulators to provide a random line display such that a three-dimensional illusion of a perspective view of the terrain passing beneath an aircraft is provided.

Another object of this invention is to provide electronic means for the generation and display of bounded surfaces such as obstacles, ribbons, or ground targets on a two-dimensional surface.

A further object of this invention is to provide electronic means for the generation and display of alternate textures such as circles and ellipses on a two-dimensional surface.

A still further object of the invention is to provide means for simultaneously displaying ground and sky planes on a cathode ray tube.

Still another object of this invention is to provide means for the generation and display of either regular or random dot textures on a cathode ray tube.

The features of the invention desired to be protected are set forth in the appended claims. The invention itself, together with further objects and advantages thereof, may best be understood by referring to the following description taken in conjunction with the appended drawings in which:

FIGURE 1 is a cathode ray tube display in the form of a perspective view of a random line surface in which the appearance of the line surface changes during a displacement of the aircraft;

FIGURE 2 illustrates a random dot surface in perspective which may be generated by the present invention;

FIGURE 3 shows in perspective a display containing a ground plane composed of randomly spaced ellipses and a sky plane composed of ranmodmly spaced dots;

FIGURE 4 illustrates graphically the construction of a bounded surface display on a cathode ray tube;

FIGURE 5 illustrates in perspective a display of successively-generated bounded segments;

FIGURE 6 is a block diagram of one embodiment of the invention for generating the displays of FIGURES 1, 2, 3, and 5;

FIGURE 7 is a block diagram of a simulator with randomization incorporated in the invention of FIGURE 6;

FIGURE 8 is a block diagram of one embodiment of the random $n$ generator illustrated in FIGURE 7;

FIGURES 8A, 8B, 8C, and 8D depict respectively the $n_1$, $n_2$, $n_3$, and total $n$ voltages produced by the $n$ generators of FIGURE 8;

FIGURE 9 illustrates a perspective view of one embodiment of the $n_3$ generator shown in FIGURE 8 for producing the random voltage component of $n$;

FIGURE 10 is a block diagram of the scan converter and intersection generator shown in FIGURE 6;

FIGURE 10A is a visual display appearing on the CRT in FIGURE 10;

FIGURE 11 is a block diagram of the simulator with two fixed $n$ steps illustrated in FIGURE 6;

FIGURE 12 is a diagram illustrating pictorially a distance in the ground plane the analog voltage of which is utilized in the simulator of FIGURE 11.

FIGURE 13 is a diagram of one embodiment of the segment generator shown in FIGURE 6;

FIGURE 13A is a diagram of the transfer function for two circuits of FIGURE 13.

FIGURE 14 is a partially schematic circuit diagram of one embodiment of the alternate textures generator shown in FIGURE 6; and FIGURE 15 is a geometrical representation of the interrelationship of variables used in constructing the display ellipses which are illustrated in FIGURE 3.

According to this invention, electronic means are provided to generate a plurality of displays on a two-dimensional surface to produce a perspective view illustrating the posture of an aircraft with respect to different references, such as, the ground or objects. These displays comprise a pattern of random lines, a group of either regularly-spaced or randomly-spaced circles or ellipses, and bounded objects such as obstacles or ground targets. Said displays are electronically generated by circuits which include improved electronic contact analog simulators and other circuitry as will be hereinafter more fully explained.

Turning now to the drawings, and more particularly to FIGURE 1, there is shown one form of a contact analog display which is traced by an electron beam on the phosphorescent inner surface of a conventional cathode ray tube. This display will be seen to comprise a picture in perspective of randomly-spaced parallel and perpendicular lines. The display is caused to change in exactly the same way in which the appearance of the ground varies during motions and maneuvers of the aircraft. Thus, the display represents a three dimensional pattern of the terrain beneath the aircraft effectively collapsed by electronic instrumentation into a two dimensional picture.

Referring now to FIGURE 2, there is shown another form of a display generated on a cathode ray tube comprising a picture in perspective of a surface of random dots. The positions and spacings of the dots are changed so that the display appears to change in exactly the same way in which the appearance of the ground varies during motions and maneuvers of the aircraft. The effect to the observer (pilot) is similar to the effect of the changing line surface shown in FIGURE 1.

In FIGURE 3 there is shown still another display on a cathode ray tube comprising a picture in perspective of a ground plane 18 and a sky plane 19. For discussion purposes, the ground plane will be defined as the space below the aircraft and the sky plane will be defined as space above the aircraft. In the particular display shown, the ground plane is portrayed by a group of randomly-spaced ellipses and the sky plane by a group of regularly-spaced dots. The display of FIGURE 3 changes with aircraft motion to provide the pilot with an illusion of said motion as do the displays of FIGURES 1 and 2.

Bounded segments may be successively generated to form displays representing such things as obstacles in the flight path, ground targets or ribbons which may be used as an aid in landing the aircraft. A method for constructing a display of bounded segments is illustrated in FIGURE 4 and will be discussed more fully in conjunction with the discussion of FIGURE 13. In FIGURE 5 there is illustrated one such display, the aforementioned ribbon which may be used as a landing aid. In a manner similar to that mentioned in conjunction with the discussion of FIGURES 1, 2 and 3, the display in FIGURE 5 changes to provide an illusion of aircraft motion.

*Display generator*

In FIGURE 6, there is illustrated in block diagram form one embodiment of the present invention in which there is shown a simulator 20 of the type disclosed in FIGURE 6 of co-pending application, Ser. No. 784,717, that is capable of producing an X-axis deflection potential $V_x$, a Y-axis deflection potential $V_y$, and a blanking voltage signal. The generation of these potentials will be more fully disclosed in connection with the discussion of FIGURE 7. Both the $V_x$ and $V_y$ deflection potentials and the blanking signal are applied directly to a scan converter and intersection generator 22.

Scan converter and intersection generator 22 is adapted to accept both deflection voltages $V_x$ and $V_y$ and blanking signals. In one of its operations, converter 22 produces the video signals such as those commonly employed in television receivers, from said deflection voltages. This operation will be fully disclosed in connection with the discussion of FIGURES 10 and 10A. In an alternate embodiment scan converter and intersection generator 22 also produces output video signals useful in generating dots illustrated in FIGURE 3. The video output signal from scan converter and intersection generator 22 is applied directly to a video mixer 26. Raster scan synchronization generator 23 provides an output voltage which causes the raster scan of scan converter and intersection generator 22 to be synchronized with the raster scans of display CRT 34 and alternate textures generator 24 which is hereinafter discussed in conjunction with the discussion of FIGURE 14.

A second simulator 28 similar to simulator 20 but modified to yield outputs comprising two specific deflection voltages, $V_{x_1}$ and $V_{x_2}$, which are used for generating bounded segments, in addition to deflection voltages $V_x$ and $V_y$ is provided. The generation of voltages $V_{x_1}$ and $V_{x_2}$ will be more fully disclosed when considered in connection with the discussion of FIGURE 11. The deflection voltages $V_x$ and $V_y$ are applied to a scan converter 32.

Scan converter 32 is similar to scan converter 22. The scans derived from the $V_x$ and $V_y$ deflection voltages are changed to a raster scan as will be explained in detail in conjunction with the discussion of FIGURES 10 and 10A. Scan converter 32 also accepts an unblanking signal from a segment generator 30. This unblanking signal is used when generating the display shown in FIGURE 5. The output of converter 32 is applied to video mixer 26.

Segment generator 30 accepts input deflection voltages $V_x$, $V_{x_1}$ and $V_{x_2}$ from simulator 28 for producing an unblanking signal. The output unblanking signal from generator 30 is applied to converter 32 and will be explained hereinafter in conjunction with the discussion of FIGURE 13.

Mixer 26 accepts video signals from converters 22 and 32 and produces a resultant video signal for application to a pilot's display CRT 34, which may be a CRT of the type commonly employed in television receivers. Further, the resultant video signal from mixer 26 may be applied directly to a transparent CRT such as disclosed in an article appearing in the December 1958 edition of Electronic Equipment Engineering, entitled "Design of a Flat Rectangular C-R Tube," by W. R. Aiken. In this application, the transparent CRT would be located in front of the pilot's windshield, the tube being transparent when not in use. CRT 34 has a raster scan synchronized with the raster scan of converter 22. The input video is presented on the face of the CRT providing displays such as those shown in FIGURES 1, 2, 3 and 5.

In an alternative embodiment of the invention an alternate textures generator 24 is utilized in combination with all or some of the other electronic circuitry shown in FIGURE 6. Textures generator 24 accepts input video signals from scan converter and intersection generator 22. Synchronizing its operations with the raster scan generated in raster scan generator 23, textures generator 24 provides an output video signal which, when displayed on CRT 34, produces a display such as ellipses shown in ground plane 18 of FIGURE 3. Although one specific arrangement of the circuitry of the invention is shown in FIGURE 6, the circuits shown therein may be used in various combinations to yield a plurality of displays such as are shown in FIGURES 1, 2, 3 and 5.

*Simulator with randomization*

Reference will now be made to FIGURE 7 which is a block diagram of the simulator with randomization 20 shown in FIGURE 6. This simulator is quite similar to the electronic contact analog simulator shown in FIGURE 5 of copending application Ser. No. 784,717. However, the instant simulator includes random $n$ generators 13C and 13D in place of the "regular" $n$ generators of said copending application. Said random $n$ generators make possible the generation of the randomly-spaced lines shown in FIGURE 1. All of the circuitry shown in FIGURE 7, with the exception of generators 13C and 13D function as explained in the aforementioned co-pending application. Also, the mathematical derivations presented therein which provide the theoretical basis for the circuitry also apply to the circuitry included in FIGURE 7. Both the circuitry presented in said FIGURE 5 of co-pending application, Ser. No. 784,717, and the circuitry of FIGURE 7 presented herein accept voltage inputs representative of the aircraft pitch angles, roll angles, heading, velocity and altitude and provide outputs which comprise blanking voltage signals and deflection voltages for the x- and y-deflection plates of a CRT.

In FIGURE 8 there is shown in block diagram form one embodiment of random $n$ generators 13C and 13D included in FIGURE 7. Random $n$ generators 13C and 13D each comprise an $n1$ generator 36, an $n2$ generator 38, and an $n3$ generator 40. The output voltage from $n1$ generator 36 is a staircase voltage as shown in FIGURE 8A. The output from $n2$ generator 38 is a slowly varying sawtooth voltage as shown in FIGURE 8B. As illustrated in FIGURE 8C, the output from $n3$ generator 40 is a random step function, the steps of which are synchronized in time with and have the same duration as the steps of the output voltage of the n1 generator 36. The outputs from the n1, n2, and n3 generators are fed to a conventional adder-amplifier 42. Adder-amplifier 42 adds the three voltages to produce the output total n voltage, the waveform of which is illustrated in FIGURE 8D. Circuitry and corresponding theory and explanations for the n1 and n2 generators 36 and 38, respectively, are disclosed in copending application, Ser. No. 784,717. Operation of the n3 generator 40 may be understood by reference to FIGURE 9 when considered in conjunction with the following description.

To synchronize the operations of the n1 and n3 generators, a voltage proportional to the step voltage from n1 generator 36 is applied to the horizontal deflection plates of CRT 46 of the n3 generator 40 which is in essence a flying spot scanner. A random line transparency 48, which may be a film such as that used in photography, is located directly across the face of cathode ray tube 46. This transparency contains a series of adjacent opaque bars having equal widths and random heights as shown in the figure.

Sweep voltages from raster scan generator 23 applied to CRT 46 cause a vertical trace to appear on the face of the tube which illuminates the transparency one bar at a time. The trace illuminates each consecutive horizontal increment of the transparency equal to the width of a bar for a time equal to the time of a step of the n1 voltage. The light output through the transparency is collected by an optical system 49 and detected by a photocell 50. The output from photocell 50 is a step function voltage which is the n3 component of the random n voltage. The successive steps of this n3 voltage have amplitudes proportional respectively to the heights of successive bars of transparency 48. Said n3 voltage steps also have a duration equal to the duration of the steps of the n1 voltage. Further, the n1 and n3 voltage steps are synchronized with each other as discussed hereinbefore.

It will be obvious to those skilled in the art that CRT 46 must illuminate exactly an integral number of complete sets of steps of random line transparency 48 with each complete pilot's display. This is necessary in order to make succeeding frames appear to be continuations of the preceding frames.

The x and y deflection voltage outputs from simulator 20, when applied to the deflection plates of a cathode ray tube 52, produce two fan-shaped scans or displays illustrated in FIGURE 10A. Each of said scans or displays originates from a point origin as shown in the figure. If the lines are made to intersect, a display of a perspective picture of a pattern of lines such as that illustrated in FIGURE 1 is realized. In one embodiment of the invention, it was desired to present the pilot's display on a CRT of the type commonly employed in television receivers. Since this type of tube required a conventional raster scan, it was necessary to utilize a scan converter to convert the fan-type scan to a raster scan. A block diagram of one embodiment of this scan converter 22 is illustrated in FIGURE 10.

Scan converter and intersection generator

In FIGURE 10 CRT 52 accepts input $V_x$ and $V_y$ deflection voltages and the blanking voltage signals from simulator 20 to produce the two fan-shaped displays shown in FIGURE 10A on the face of said CRT. Each fan-shaped display is picked up by a set of optical lenses 54 and imaged on a vidicon 56. Raster scan sweep voltages from raster scan generator 23 are applied to vidicon 56 and the information imaged on said vidicon is read out by said raster scan. The raster scan of the pilot's display CRT is synchronized with this scan. The outputs from vidicons 56 are applied directly to a video amplifier 62 for amplification. The video signal output of amplifier 62 is applied to the pilot's cathode ray tube 34 for the display of a random line surface such as that illustrated in FIGURE 1.

It will be apparent to those skilled in the art that scan conversion from fan to raster scan may be realized by employing one set of optical lenses 54 and one vidicon 56. Two of each are illustrated in FIGURE 10 in order to facilitate the detailed explanation of the operation of the intersection generator and show how a display of dots can be generated. The method of obtaining said display of dots is fully explained hereinafter.

A display of a system of dots such as shown in FIGURE 2 may be generated by adding intersection generator circuitry to the scan converter of FIGURE 10. The intersection generator determines the points of intersection of the lines of the random line surface. If regularly-spaced lines are utilized, the display of dots is accordingly regular. If randomly-spaced lines are utilized, the display is random dots. Said additional circuitry comprises "AND" gate 58 shown in FIGURE 10. Each of the pictures imaged on vidicons 56 is read out by a raster scan as explained hereinbefore and is applied to "AND" gate 58. "AND" gate 58 is conventional and produces an output voltage only when simultaneous input voltages are obtained. Said simultaneous inputs to "AND" gate 58 occur only at an intersection of the scanned lines displayed on CRT 52. The output from the "AND" gate occurring at intersections of the displays shown in FIGURE 10A is applied to video amplifier 62. The amplified output from amplifier 62 may be fed directly to the pilot's display CRT 34 to produce a random dot display or may be combined in video mixer 26 along with a video signal from scan converter 32 to produce a random dot with a superimposed bounded segment display.

Referring back to FIGURE 6, the output from scan converter and intersection generator 22 is fed to video mixer 26 where it is mixed with the output from scan converter 32 which is similar to scan converter and intersection generator 22 as hereinbefore stated. The difference between scan converter and intersection generator 22 and scan converter 32 in the embodiment of the invention shown in FIGURE 6 is the addition of "AND" gate 58 to the former in an alternative embodiment, as hereinbefore discussed. The resulting output from the video mixer 26 is applied to the pilot's display CRT 34.

Simulator with two fixed n steps

In FIGURE 11 there is shown a detailed block diagram of the simulator with two fixed n steps 28. It will be observed that FIGURE 11 is similar to FIGURE 7 with the addition of adders 90 and 92, switches 112 and 114, sawtooth generator 9C and computer stages 14C and 15C. Random n generators 13C and 13D of FIGURE 7 have been eliminated while "regular" n generator 13A, which is the same "regular" n generator as disclosed in co-pending application, Ser. No. 784,717, has been substituted for random n generator 13C of FIGURE 7.

Two fixed voltages $-r$ and $+r$ which have unity magnitude are applied to adders 90 and 92, respectively. Each of these voltages has a magnitude equal to the voltage magnitude of one step of the n1 staircase voltage generator in n1 generator 36. Each adder 90 and 92 also accepts an input voltage D. Voltage D is an analog voltage of a distance, which is fully defined hereinafter in conjunction with the discussion of FIGURE 12. In said figure there is shown a segment 115 which lies in the ground plane 117. Point O is the observer. Point s is the plane 117 is the point of intersection of a line from O drawn perpendicular to the plane. Point t on the center line of the segment 115 is the point of intersection of a line from s drawn perpendicular to the center line of the segment 115. The distance from the point s to the point t is then d. The voltage analog of said distance d is the hereinbefore mentioned voltage D.

The voltage D may be obtained from any of several sources. The source used is usually determined by the particular application of the graphic construction display generator. For example, if it is desired to construct a ribbon representing the flight path of the aircraft, such as that shown in FIGURE 5, digital voltage commands including a signal representing distance $d$ could be fed from a ground based landing system over a data link transmission system to a digital-to-analog converter in the aircraft. Said converter would derive the analog voltage D. If the flight path were being determined in the aircraft, a computer in the aircraft could be utilized to compute a desired flight path and could supply an output voltage D. It will be apparent to those skilled in the art that other sources of voltage D could be utilized.

Said voltages D and $-r$ are added in adder 90, and voltages D and $+r$ are added in adder 92. The resultant output voltage from adder 90 corresponds to a specific value of $n$, and the resultant output voltage from adder 92 corresponds to another specific $n$. Each of these voltages is fed through one of two channels, said first channel comprising sawtooth generator 9B, computer stages 14B and 15B and switch 112, and said second channel comprising sawtooth generator 9C, computer stages 14C and 15C and switch 114.

Said sawtooth generators and computer stages are identical to sawtooth generator 9A and computer stages 14A and 15A, respectively, which are shown in FIGURE 7. Detailed circuitry and operation for each of the generators and computers are fully described in co-pending application, Ser. No. 784,717. However, in the present case, the circuitry processes one voltage in each channel, each voltage corresponding to a particular $n$. The voltage output from computer stage 15B, $V_{x_1}$, is fed through line 116 to electronic switch 12 and from there to scan converter 32 (see FIGURE 6) when it is desired to scan a vertical line for bounded surfaces or segments. Switch 112 is open during this operation.

To scan lines horizontally on the display of bounded surfaces or segments, switch 112 is closed and $V_{x_1}$ is fed through said switch 112 to a segment generator 30, which is shown in FIGURE 13. As mentioned hereinbefore, the second channel of the two step $n$ generator provides a similar output voltage $V_{x_2}$. Said voltage $V_{x_2}$ is applied through line 118 to switch 12 and thence to scan converter 32 when scanning vertical lines. Switch 114 is open during this operation. Where it is desired to scan lines horizontally, switch 114 is closed and $V_{x_2}$ is fed through said switch 114 to segment generator 30. The difference between voltages $V_{x_1}$ and $V_{x_2}$ is contained in the input voltages $-r$ and $+r$.

Segment generator

In FIGURE 13 there is shown in block diagram form the segment generator 30 used in combination with the circuitry of FIGURE 11 to generate voltages for the production of a display of segments. A conventional amplifier 125 accepts input voltage $V_x$ from simulator 28 and provides an output voltage $-V_x$. Said output voltage $-V_x$ is fed to adderamplifiers 121 and 122 which also accept input voltages $V_{x_1}$ and $V_{x_2}$, respectively, from simulator 28 shown in FIGURE 6. Said adders 121 and 122 add the input voltages and provide output voltages of $V_{x_1}-V_x$ and $V_{x_2}-V_x$, respectively. The voltage output from adder 121 is fed to comparator 123. Comparator 123 is the type commonly known in the computer art and has a transfer function as shown in FIGURE 13A. The step voltage output from said comparator is either positive or negative as shown in FIGURE 13A, depending on whether the input voltage $V_{x_1}-V_x$ is positive ($V_x<V_{x_1}$) or negative ($V_x>V_{x_1}$), respectively.

Comparator 124 is identical to comparator 123. It accepts an input voltage $V_{x_2}-V_x$ and produces an output step voltage as shown in FIGURE 13A. Said output step voltage is either positive or negative, depending on whether the input voltage $V_{x_2}-V_x$ is positive ($V_x<V_{x_2}$) or negative ($V_x>V_{x_2}$) respectively.

The output step voltages from comparators 123 and 124 are fed to and trigger a conventional bistable multivibrator 126. The resultant positive output voltage pulse from multivibrator 126 is fed to CRT 52 in scan converter 32 and unblanks said CRT. The output voltage pulse from multivibrator 126 starts when $V_x$ equals $V_{x_1}$ and ends when $V_x$ equals $V_{x_2}$. Thus a horizontal trace is obtained on CRT 52 when $V_{x_1}<V_x<V_{x_2}$ or between the two vertical traces on the CRT as shown in FIGURE 4.

It will be understood by those skilled in the art that in the generation of bounded segments, compensation for aircraft roll could be made by using a coordinate rotator similar to coordinate rotator stage 8 of FIGURE 7 in conjunction with the circuitry of FIGURES 12 and 13.

Alternate textures generator

In FIGURE 14, there is shown a partially schematic diagram of alternate textures generator 24 illustrated in FIGURE 6. In order to comprehend the functioning of this circuit it is convenient to go through the mathematical derivation of the functions necessary to generate alternate textures. As an example, consider the generation of a perspective picture of circles on the ground.

In FIGURE 15 there is shown the display plane 95 which is the face of the pilot's display cathode ray tube. Circle 97 in the ground plane is represented in perspective as an ellipse 99 on the display plane.

Definitions of letters and symbols used in the illustration are:

$O$ = the point at which the observer's eye is located
$N$ = the nadir point of the aircraft
$h$ = the height or the altitude of the aircraft above ground
$p$ = the viewing distance or the distance from the observer's eye to the center of the display
$O'$ = the center of the display plane
$\phi$ = the pitch angle of the aircraft
$\delta$ = the depression angle of the point $(x_i, y_i)$ from the display plane x-axis (The point $(x_i, y_i)$ is defined hereinafter)

For discussion purposes, it is convenient to define two coordinate axis system, one in the ground plane and one in the display plane. The display plane $(x, y)$ coordinate axis system, the origin of which is at point $O'$, has an x-axis which is parallel to the horizontal axis of said display plane and a y-axis which is parallel to the vertical axis of said display plane. The ground plane $(X, Y)$ coordinate system, the origin of which is at point $N$, has an X-axis parallel to the horizontal axis of the aircraft, and a Y-axis parallel to the longitudinal axis of the aircraft.

Consider a circle 97 of radius C in the ground plane with its center at point $(X_i, Y_i)$. The equation in ground plane coordinates for said circle is $$\frac{(X-X_i)^2}{C^2}+\frac{(Y-Y_i)^2}{C^2}=1$$

In general, the projection of this circle into the display plane, for any given position of the display plane, will be an ellipse. Further, the center of the ellipse, point $(x_i, y_i)$, approximately at the point of projection in the display plane of the ecnter of said circle, point $(X_i, Y_i)$. The equation, in display plane coordinates, of said ellipse is $$\frac{(x-x_i)^2}{a^2}+\frac{(y-y_i)^2}{b^2}=1$$

where $a$ and $b$ are the semi-major and semi-minor axes of the ellipse respectively.

Trigonometric relationships of quantities shown in FIGURE 15 yield:

$$Y_i = h \cot(\delta+\phi)$$

or $$Y_i = h\frac{1-\tan\delta\tan\phi}{\tan\delta+\tan\phi} \tag{1}$$

Also, from FIGURE 13, it can be seen that $$y_i = p \tan\delta$$

or $$\tan \delta = y_i/p \qquad (2)$$

Substituting Equation 2 into Equation 1 yields $$Y_i = h \frac{1 - \frac{y_i}{p} \tan \phi}{\frac{y_i}{p} + \tan \phi} \qquad (3)$$

Differentiating (3) and simplifying said differentiated equation yields $$\frac{dY_i}{dy_i} = \frac{h}{p} \frac{1}{\left(\frac{y_i}{p} \cos \phi + \sin \phi\right)^2} \qquad (4)$$

The Y scale factor, $S_y$, at the point $(x_i, y_i)$ or at any point on the line parallel to the horizon and passing through $(o, y_i)$ is given by $$S_y = \left|\frac{dy_i}{dY_i}\right|$$

or from Equation 4

$$S_y = \frac{p}{h} \left(\frac{y_i}{p} \cos \phi + \sin \phi\right)^2 \qquad (5)$$

Using a similar diagram, the X scale factor, $S_x$, at the point $(x_i, y_i)$ or at any point along the line parallel to the horizon and passing through $(o, y_i)$ can be determined. It is found to be $$S_x = \left|\frac{dx_i}{dX_i}\right|$$

or $$S_x = \frac{p}{h} \left(\frac{y_i}{p} \cos \phi + \sin \phi\right) \qquad (6)$$

The elipse on the display is then described by the equation $$\frac{(x-x_i)^2}{(CS_x)^2} + \frac{(y-y_i)^2}{(CS_y)^2} = 1$$

Equations 5 and 6 neglect aircraft roll and the skewing of the axes of the ellipses which occurs at places other than at the center of the display.

If there is aircraft roll, compensation for said roll must be made in a manner similar to that described in copending application, Ser. No. 784,717. In order to compensate for aircraft roll, $x$ and $y$ must be transformed to $x'$ and $y'$ by $$x' = x \cos \rho - y \sin \rho$$
$$y' = x \sin \rho + y \cos \rho$$

where $\rho$ is the roll angle taken positive in the counterclockwise direction. These equations are the same equations as those presented for aircraft roll compensation in the aforementioned co-pending application. The effect of not skewing the axes is small, therefore no compensation is made for it.

To generate the ellipses, the $x$ and $y$ deflection voltages of display cathode ray tube 34 are generated so that they vary sinusoidally at equal frequencies and have amplitudes proportional to $CS_x$ and $CS_y$, respectively. Each sine wave is applied to a pair of deflection plates of the CRT and the resultant Lissajous patterns form the ellipses on the display. Computation of $S_x$ and $S_y$ is performed in the alternate textures generator 24 one embodiment of which is shown in FIGURE 14.

A reference D-C voltage having unity magnitude is impressed across sine potentiometer 68. The setting of arm 69 of said potentiometer is determined by the aircraft pitch angle $\phi$, said value of $\phi$ being obtained from available aircraft instruments. Thus, the potential on arm 69 of potentiometer 68 is sin $\phi$; this output is applied to adder 72. The output video voltage signals from scan converter and intersection generator 22, which represents the intersections of the lines shown in FIGURE 10A extended, together with the deflection voltage from raster scan generator 23 are applied to a gate circuit 73. Said gate is conventional and is well known in the computer art. The video signal turns the gate on so that there is produced a deflection voltage $y_i$. Voltage $y_i$ is resistively scaled in gate circuit 73 to yield the output voltage $y_i/p$ from gate 73, where the factor $p$ is the viewing distance as hereinbefore defined. The voltage $y_i/p$ is impressed across a cosine potentiometer 70. The output arm of this potentiometer also has a position determined by $\phi$. Thus the output of potentiometer 70 is a voltage $$\frac{y_i}{p} \cos \phi$$

and is also applied to adder 72.

Adder 72 accepts the two mentioned inputs, adds them, and supplies an output voltage $$\left(\frac{y_i}{p} \cos \phi + \sin \phi\right)$$

The output from said adder is simultaneously impressed across linear potentiometer 78 and applied to square law function generator 74, which may be a diode-type function generator, which is well known in the computer art. Said square law function generator accepts the input voltage and produces an output voltage which is equal to the input voltage squared.

The setting of the arm of potentiometer 78 is determined by the ratio of $p/h$. The quality $p$ is the fixed viewing distance as before mentioned and $h$ is the altitude obtained from conventional aircraft instruments. The output of potentiometer 78 is $$\frac{p}{h} \left(\frac{y_i}{p} \cos \phi + \sin \phi\right)$$

It will be recalled that this quantity is $S_x$, the $x$ scale factor of Equation 6.

Square law function generator 74 accepts the input voltage $$\left(\frac{y_i}{p} \cos \phi + \sin \phi\right)$$

and squares said voltage supplying an output voltage $$\left(\frac{y_i}{p} \cos \phi + \sin \phi\right)^2$$

The output from generator 74 is impressed across potentiometer 76. The magnitude of the output from potentiometer 76 is determined by the ratio $p/h$ in the same manner in which the output of potentiometer 78 is determined. Said output voltage from potentiometer 76 is $$\frac{p}{h} \left(\frac{y}{p} \cos \phi + \sin \phi\right)^2$$

which will be recognized as $S_y$ the $y$ scale factor given by Equation 5. Both $S_x$ and $S_y$ are applied to a variable amplitude sinewave generator, 80. Said generator supplies outputs which are two sinusoidal voltages having equal frequencies, but differing in phase by 90°.

One output from generator 80 is fed to adder 82 which also acts as an amplifier and the other is applied to a similar adder 84 which also acts as an amplifier. In addition, there is applied to each of said adders a raster scan, which may be obtained from any raster scan sweep circuit, as for example, from raster scan generator 23 of FIGURE 6. The raster scan is synchronized with the raster scan of vidicon 88. Adders 82 and 84 add their respective inputs and supply output voltages to the deflection plates of cathode ray tube 86. An unblanking pulse from "AND" gate 58, shown in FIGURE 10, is also applied to cathode ray tube 86 to unblank the tube at programmed intervals. A display of ellipses which are generated by the well known Lissajous technique appears on the face of the tube. The ratio of the semi-major to the semi-minor axes of the displayed ellipses are determined by the relative amplitudes of the sine wave outputs from generator 80. Optical lens 87 collects the light on the face of CRT 86 and images this light on vidicon 88, which functions as a storage device. The raster scan for vidicon 88 is synchronized with the raster used for cathode ray tube 86 to synchronize the displays of both tubes. The output from vidicon 88 is applied to and displayed on the pilot's display cathode ray tube 34, providing a display such as that shown in ground plane 18 of FIGURE 3. Optical lens 87, vidicon 88 and CRT 86 are not necessary to practice this invention unless the video to be combined with other video information on a display is presented on a CRT having restricted scanning capability, such as the Aiken type tube.

It will be obvious to those skilled in the art that other embodiments of the disclosed invention are possible. For instance it would be possible to include only one group of computation circuits and switch and parameter inputs to realize the various displays disclosed herein. It would be feasible to time share all data processing circuits common to the segment generator and the ground plane generator as well as those common to the two vanishing points, the ground plane generator, and the segment generator.

It is also possible to use several combinations of the basic circuitry presented herein to obtain voltages which when used in conjunctinn with a CRT, yield a number of different displays. For example, simulator with randomization 20 yields randomly-spaced lines; the combination of simulator 20 and scan converter and intersection generator 22 yields randmoly-spaced dots; the combination of the simulator of co-pending application, Ser. No. 784,717, and scan converter and intersection generator 22 yields regularly-spaced dots; the combination of simulator 20, scan converter and intersection generator 22, and alternate textures generator 24 yields randmoly-spaced ellipses; and the combination of simulator with two fixed $n$ steps 28 and segment generator 30 yield bounded segments.

Also, by usng the combination of two simulators 20, scan converter and intersection generator 22, alternate textures generator 24, and video mixer 26, there will be obtained a display comprised of the combination of a randomly-spaced ellipse ground plane 18 and a random dot sky splane 19 as shown in FIGURE 3. Another display, not illustrated herein, may be generated utilizing the combination of simulator 20; scan converter and intersection generator 22, alternate textures generator 24, simulator 28, segment generator 30, scan converter 32 and video mixer 26. Said display would be a series of successively generated segments arranged to form a ribbon or to represent an obstacle, superimposed on a background of randomly-spaced ellipses.

While particular embodiments of the invention have been shown and described herein, it is not intended that the invention be limited to such disclosure, but that changes and modifications can be made and incorporated within the scope of the claims.

What is claimed as new and desired to be secured by Letters Patent in the United States is:

1. An electronic system for generating a simulated three-dimensional display on a two-dimensional utilization device to produce a perspective view illustrating the posture of an observer with respect to a reference surface comprising:

means for producing a display of randomly-spaced display members providing an illusion of the perspective picture of said reference surface moving with respect to said observer;

said means comprising means for generating a set of $x$ and $y$ deflection voltages responsive to postural data and producing a first and second plurality of lines, the lines in each said plurality forming a perspective representation of randomly-spaced coplanar parallel lines having a common vanishing point, with the lines in said first plurality appearing orthogonal to the lines in said second plurality and coplanar therewith;

means for applying said set of $x$ and $y$ deflection voltages to a display device such that said respective pluralities of lines are displayed;

electronic means responsive to said display for providing a video signal combining said first and second plurality of lines in perspective representation of said reference surface; and means for applying said video gisnal to said utilization device.

2. An electronic system as set forth in claim 1 for use in vehicles wherein said refernce surface represents the surface of the earth and said postural data comprises pitch, roll, heading, velocity and altitude, and wherein said first plurality of lines represent north-south lines and said second plurality of lines represent east-west lines.

3. An electronic system as set forth in claim 1 wherein said electronic means responsive to said display further comprises means for detecting the points of intersection of said displayed line pluralities and means for producing a video signal indicative thereof for application to said utilization device.

4. An electronic system as set forth in claim 1 for producing a display textured by scattered ellipses wherein said electronic means responsive to said display further comprises means for detecting the points of intersection of said displayed line pluralities and means for producing a video signal indicative of the location thereof, and having in addition thereto means for generating a pair of variable amplitude sine wave voltages to form video signals describing ellipses, positioned at said intersections in response to said position indicative video signal and having amplitudes responsive to postural data including an inverse proportionality to the differences in $y$ deflection voltages referenced to voltage at the vanishing point so as to simulate equal diameter circles scattered upon said reference surface.

5. An electronic system for generating a simulated three-dimensional display on a cathode ray tube to produce a perspective view illustrating the posture of an observer with respect to a reference comprising:

means for generating a set of $x$ and $y$ deflection voltages responsive to postural data and producing a first and second plurality of lines, said second plurality consisting of two lines, the lines in each said plurality forming a perspective representation of coplanar parallel lines having a common vanishing point, with the lines in said first plurality appearing orthogonal to the lines in said second plurality and coplanar therewith;

means for detecting when the $x$ deflection voltages of said first plurality lie between the $x$ deflection voltages of said two lines to produce an unblanking signal;

electronic means responsive to said unblanking signal for converting said $x$ and $y$ deflection voltages into a video signal combining said first and second pluralities of lines in a perspective representation of a bounded surface segment; and means for applying said video signal to a cathode ray tube, whereby there is produced a display of a bounded surface segment.

6. An electronic system as set forth in claim 5 for use in vehicles wherein said reference surface is a desired flight path segment and said postural data comprises pitch, heading, velocity, altitude, and lateral offset from said segment; and wherein said first plurality of lines represents cross-course lines and said second plurality represents on-course lines bounding said flight path segment.

7. An electrical system for generating three-dimensional displays on a cathode ray tube to produce a perspective view illustrating the posture of an observer with respect to a reference comprising:

a first means for generating a first set of $x$ and $y$ deflection voltages responsive to postural data and producing a first and second plurality of lines;

a second means for generating a second set of $x$ and $y$ deflection voltages responsive to postural data and producing a third and fourth plurality of lines, said fourth plurality consisting of two lines; the lines in each said plurality forming a perspective representation of coplanar parallel lines having a common vanishing point with the lines in said first and second pluralities being mutually orthogonal and coplanar therewith and the lines in said third and fourth pluralities being mutually orthogonal and coplanar therewith;

first electronic means for converting said first set of $x$ and $y$ deflection voltages into a first video signal combining said first and second pluralities of lines in perspective representation of a reference surface;

means for detecting when the $x$ deflection voltages of said third plurality lie between the $x$ deflection voltages of said two lines to produce an unblanking signal;

second electronic means responsive to said unblanking signal for converting said second set of $x$ and $y$ deflection voltages into a second video signal combining said third and fourth pluralities of lines in perspective representation of a second surface bounded by said two lines, and means for applying both said first and second video signals to said cathode ray tube, whereby there is produced on said cathode ray tube a display of a reference surface and bounded surface segment.

8. An electronic system as set forth in claim 7 for use in vehicles wherein said reference defined by said first and second plurality of lines represents the surface of the earth and the bounded surface segment defined by said third and fourth plurality of lines is a flight path segment; and said postural data comprises pitch, roll, heading, velocity, altitude and lateral offset from said segment; and wherein said first and second plurality of lines represent respectively north-south and east-west lines and said third and fourth plurality of lines represent respectively cross-course lines and on-course lines bounding said fligh segment.

9. An electronic system as set forth in claim 7 wherein said first and second line pluralities are randomly spaced.

10. An electronic system as set forth in claim 7 wherein said first electronic means further comprises means for detecting the points of intersection of said first and second pluralities of lines and means for producing a video signal indicative thereof.

11. An electronic system as set forth in claim 7 wherein said first electronic means further comprises means for detecting the points of intersection of said first and second pluralities of lines and for producing a video signal indicative of the location thereof; and having in addition thereto means for generating a pair of variable amplitude sine wave voltages to form video signals describing ellipses, positioned at said intersections in response to said position indicative video signal and having amplitudes responsive to postural data including an inverse proportionality to the differences in $y$ deflection voltages referenced to the voltage at the vanishing point so as to simulate equal diameter circles scattered upon said reference surface, said video signal describing ellipses being applied to said cathode ray tube.

References Cited

UNITED STATES PATENTS

| | | | |
|---|---|---|---|
| 2,415,981 | 2/1947 | Wolff | 178—6.8 |
| 2,848,532 | 8/1958 | Weida | 235—177 |
| 2,967,263 | 1/1961 | Steinhauser | 343—11 |
| 2,796,603 | 6/1957 | Landee et al. | 343—11 |
| 2,720,646 | 10/1955 | Berger et al. | 343—11 |
| 3,012,729 | 12/1961 | Skramstad et al. | 235—197 |
| 2,933,254 | 4/1960 | Goldberg et al. | 235—197 |
| 2,933,255 | 4/1960 | Kohl | 235—198 |
| 2,415,191 | 2/1947 | Rajckman | 235—198 |
| 3,093,822 | 6/1963 | Balding | 343—11 |
| 3,159,743 | 12/1964 | Brouillette | 235—198 |

MARTIN P. HARTMAN, *Primary Examiner.*

U.S. Cl. X.R.

343—11; 340—27. 324—1; 235—198